US010779203B1

United States Patent
Vickers et al.

(10) Patent No.: US 10,779,203 B1
(45) Date of Patent: Sep. 15, 2020

(54) COMMUNICATION SYSTEM WITH LMR-LTE SWITCHING AND RELATED METHODS

(71) Applicant: EAGLE TECHNOLOGY, LLC, Melbourne, FL (US)

(72) Inventors: Michael Vickers, Forest, VA (US); Martin Barringer, Bedford, VA (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 0 days.

(21) Appl. No.: 16/509,705

(22) Filed: Jul. 12, 2019

(51) Int. Cl.
| | |
|---|---|
| *H04W 36/00* | (2009.01) |
| *H04W 60/04* | (2009.01) |
| *H04B 17/318* | (2015.01) |
| *H04W 36/30* | (2009.01) |
| H04W 84/04 | (2009.01) |

(52) U.S. Cl.
CPC ...... *H04W 36/0066* (2013.01); *H04B 17/318* (2015.01); *H04W 36/00835* (2018.08); *H04W 36/30* (2013.01); *H04W 60/04* (2013.01); *H04W 84/042* (2013.01)

(58) Field of Classification Search
CPC ..... H04M 7/006; H04W 24/08; H04W 36/14; H04W 36/18; H04W 36/30; H04W 92/02
See application file for complete search history.

(56) References Cited

U.S. PATENT DOCUMENTS

| | | | |
|---|---|---|---|
| 7,039,027 B2 | 5/2006 | Bridgelall | |
| 7,596,194 B2 | 9/2009 | Janky | |
| 9,161,386 B1 | 10/2015 | Beghini et al. | |
| 10,523,818 B1 * | 12/2019 | Rathnam | H04W 4/12 |
| 2006/0003763 A1 | 1/2006 | Almgren | |
| 2006/0262771 A1 * | 11/2006 | Martinez | H04L 12/4633 370/349 |
| 2015/0148067 A1 * | 5/2015 | Ying | H04W 48/20 455/456.1 |
| 2016/0278038 A1 * | 9/2016 | Larsson | H04W 64/006 |
| 2018/0206166 A1 * | 7/2018 | Ganesan | H04M 7/006 |

OTHER PUBLICATIONS

Annonymous "P25 Connectivity: Portable and Mobile Radio Family mission-critical communications" Harris.com; pp. 12.
Annonymous "Tait Communications demonstrates true seamless roaming across LTE and P25 networks" https://www.taitradio.com/about-us/news/2017/tait-communications-demonstrates-true-seamless-roaming-across-lte-and-p25-networks: Mar. 28, 2017; pp. 3.

* cited by examiner

*Primary Examiner* — Liton Miah
(74) *Attorney, Agent, or Firm* — Allen, Dyer, Doppelt + Gilchrist, P.A.

(57) ABSTRACT

A communication system may include a cellular telephone network, an LMR network, and mobile wireless communications devices. Each mobile wireless communications device may be switchable from the cellular telephone network to the LMR network, and may generate device data. The communication system also may have a server configured to cause a given mobile wireless communications device to switch from the cellular telephone network to the LMR network based upon the device data.

23 Claims, 3 Drawing Sheets

COMMUNICATION SYSTEM WITH LMR-LTE SWITCHING AND RELATED METHODS

TECHNICAL FIELD

The present disclosure relates to the field of communications, and, more particularly, to mobile wireless communications devices and related methods.

BACKGROUND

Mobile communications devices have become an integral part of society over the last two decades. Indeed, more than eighty-two percent of Americans own a mobile communications device, for example, a cell phone. The typical mobile communications device includes an antenna, and a transceiver coupled to the antenna. The transceiver and the antenna cooperate to transmit and receive communication signals.

The land mobile radio (LMR) network is a regulated system for radio communications between land-based mobile and stations. The service is commonly utilized by emergency first responder organizations, public works organizations, and other organizations with numerous mobile field staff. In a conventional LMR system, a base station or repeater transmits and receives signals from a number of mobile or portable radio units, which are sometimes called subscriber units. In a conventional LMR trunked radio system, a relatively small number of radio channels are commonly used to facilitate voice and data communications between the base station and many LMR subscriber radios. LMR is primarily designed to meet the critical narrowband voice communications needs of first responders and others.

Many LMR communications devices include a plurality of wireless transceivers for permitting use of multiple communication systems. For example, due to the pervasive penetration of the cellular communication system, many of the LMR communications devices include wireless cellular transceivers. The wireless cellular transceivers permit the LMR communications devices to operate outside the LMR communication system. For users that cover large service areas, this can be helpful.

SUMMARY

Generally, a communication system may include a cellular telephone network, an LMR network, and a plurality of mobile wireless communications devices. Each mobile wireless communications device may be switchable from the cellular telephone network to the LMR network, and may be generating device data. The communication system may also comprise a server configured to cause a given mobile wireless communications device to switch from the cellular telephone network to the LMR network based upon the device data.

In particular, the device data may include a geolocation of the given mobile wireless communications device, and a received signal strength of the given mobile wireless communications device associated with the cellular telephone network. The server may be configured to switch from the cellular telephone network to the LMR network further based upon at least one quality of service (QoS) rule. The server may be configured to generate an estimated future geolocation for the given mobile wireless communications device, and the server may be configured to switch from the cellular telephone network to the LMR network further based upon the estimated future geolocation.

Moreover, the LMR network may comprise a plurality of LMR sites, and the server may be configured to select a given LMR site from the plurality of LMR sites and communicate the given LMR site to the given mobile wireless communications device. The server may be configured to select the given LMR site based upon at least one QoS rule. The server may be configured to preregister the given mobile wireless communications device with the given LMR site. The cellular telephone network may comprise an LTE cellular telephone network, for example. The given mobile wireless communications device may be configured to send the device data to the server periodically.

Another aspect is directed to a communication system. The communication system may include a plurality of mobile wireless communications devices. Each mobile wireless communications device may be switchable from a cellular telephone network to an LMR network, and may be generating device data. The communication system may also include a server configured to cause a given mobile wireless communications device to switch from the cellular telephone network to the LMR network based upon the device data.

Yet another aspect is directed to a method of operating a communication system comprising a cellular telephone network, a LMR network, and a plurality of mobile wireless communications devices. Each mobile wireless communications device may be switchable from the cellular telephone network to the LMR network, and may be generating device data. The method may include operating a server to cause a given mobile wireless communications device to switch from the cellular telephone network to the LMR network based upon the device data.

DETAILED DESCRIPTION

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout.

LMR communications devices with integrated cellular transceivers may provide a larger radio frequency (RF) coverage area for public safety and public service workers. In some approaches, the LMR communications devices may determine when the current RF interface is unavailable and roam to the next available network. In other words, if the LMR network is not available, the device would switch to an alternative cellular network, for example. However, when cellular/LMR RF coverage overlaps, network administrators may prefer the device to operate on their home LMR network. This may be because of associated costs for using the cellular network.

Some approaches may use manual operation by the user to return to the LMR network when coverage is still acceptable for cellular coverage, but this requires user intervention. To roam automatically to the LMR network, the LMR communications device may need information on whether an LMR RF site exists and that it is better per the preference of the network administrator than the cellular alternative.

Figure 1:
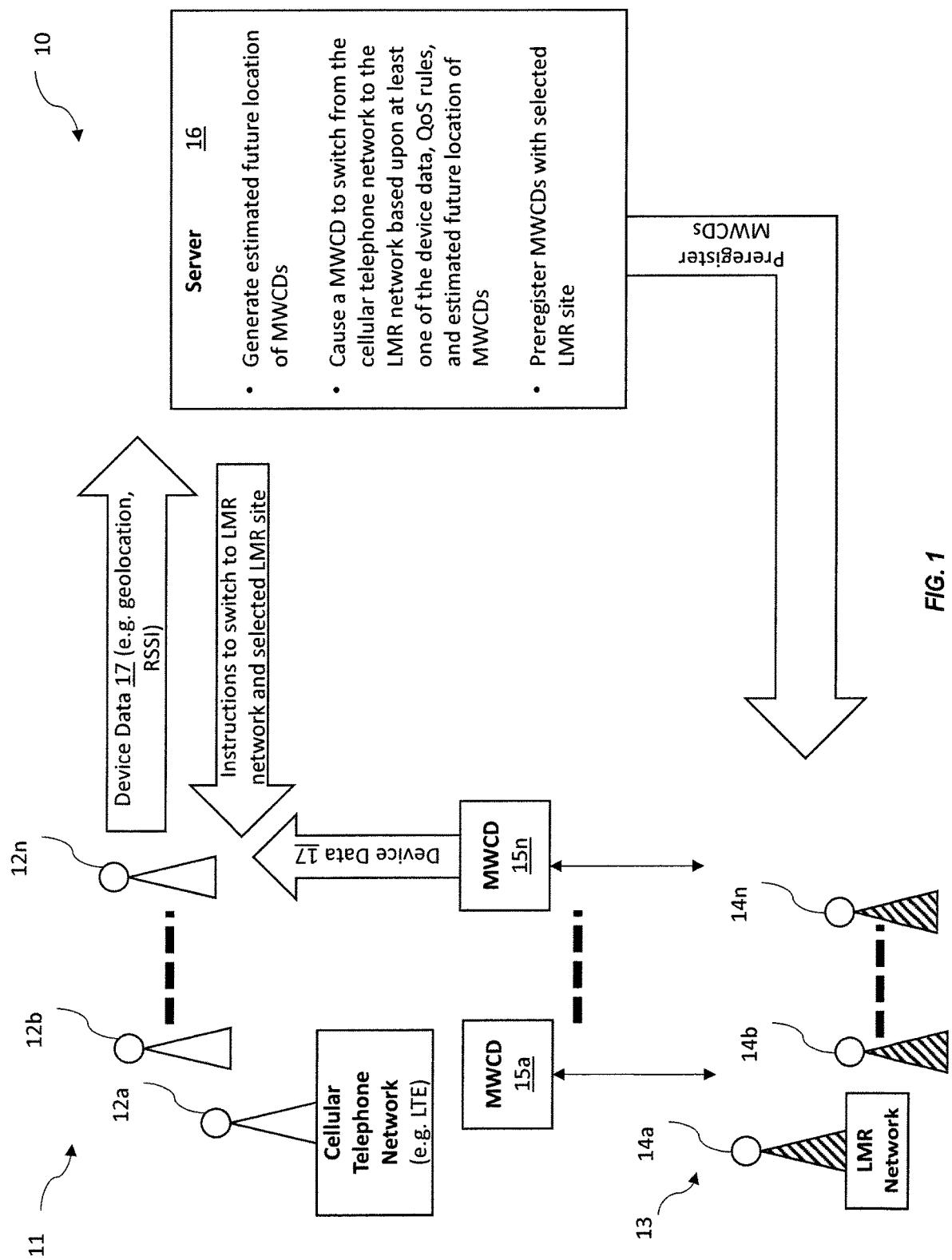
FIG. 1 is a schematic diagram of a communication system, according to the present disclosure.

Referring initially to FIG. 1, a communication system 10 illustratively comprises a cellular telephone network 11. For example, the cellular telephone network 11 may comprise an LTE cellular telephone network. The cellular telephone network 11 may also support one or more additional cellular network standards, such as the Global System for Mobile Communications (GSM) standard, and the code-division multiple access (CDMA) standard. The cellular telephone network 11 illustratively includes a plurality of cellular sites 12a-12n (e.g. cellular network towers, base stations, and repeaters).

The communication system 10 illustratively comprises an LMR network 13. The LMR network 13 illustratively comprises a plurality of LMR sites 14a-14n (e.g. LMR network towers, base stations, and repeaters). The LMR network 13 may operate on one or more of the ultrahigh frequency (UHF) band, the very high frequency band (VHF), and may implement one or more of the following standards the Project 25 (P25 or APCO-25) communication standard, the push-to-talk (PTT) communication standard, and the time-division multiple access (TDMA) standard.

The communication system 10 illustratively comprises a plurality of mobile wireless communications devices 15a-15n. Each mobile wireless communications device 15a-15n comprises wireless transceivers configured to operate on at least the cellular telephone network 11 and the LMR network 13. Each mobile wireless communications device 15a-15n is configured to be able to switch from the cellular telephone network 11 to the LMR network 13.

As will be appreciated, the administrator of the plurality of mobile wireless communications devices 15a-15n typically owns and operates the LMR network 13. Differently, the administrator may use the cellular telephone network 11 on a pay-as-you-go basis. Because of this, there is a cost reduction benefit to using the LMR network 13.

Also, each mobile wireless communications device 15a-15n is configured to generate device data 17. The communication system 10 illustratively comprises a server 16 in communication with the plurality of mobile wireless communications devices 15a-15n and configured to receive the device data 17 over the cellular telephone network 11 from each wireless communications device.

For example, each mobile wireless communications device 15a-15n may comprise an XL-200P radio modified with the teachings herein, as available from the Harris Corporation of Melbourne, Fla., the Applicant of the present application. Also, each mobile wireless communications device 15a-15n may comprise RF components as disclosed in U.S. Pat. No. 9,161,386 to Beghini et al., the contents of which are hereby incorporated by reference in their entirety, which shares the same Applicant of the present application.

In particular, the device data 17 may include a geolocation of each mobile wireless communications device 15a-15n. As will be appreciated, each mobile wireless communications device 15a-15n may include a geolocation device, for example, a global positioning system (GPS) receiver, configured to generate the geolocation (e.g. longitude and latitude coordinates).

Also, the device data 17 may include a received signal strength (e.g. received signal strength indicator (RSSI)) of each mobile wireless communications device 15a-15n associated with the cellular telephone network 11. The device data 17 may include a received signal strength (e.g. RSSI) of each mobile wireless communications device 15a-15n associated with the LMR network 13. As will be appreciated, the received signal strength values are proxies for respective network connection quality.

The server 16 is configured to generate an estimated future geolocation for each mobile wireless communications device 15a-15n. In particular, the server 16 is configured to generate a vector for each mobile wireless communications device 15a-15n based upon changes in the geolocation. Based upon the determined vector, the server 16 is configured to generate/extrapolate the estimated future geolocation.

Also, the server 16 is configured to store a plurality of QoS rules for the plurality of mobile wireless communications devices 15a-15n with regards to the cellular telephone network 11 and the LMR network 13. For example, the plurality of QoS rules may govern received signal strength thresholds.

The mobile wireless communications devices 15a-15n are each configured to send the device data 17 to the server 16 periodically. For example, the device data 17 may be transmitted to the server 16 at a rate of 1/minute. In some embodiments, the mobile wireless communications devices 15a-15n are each configured to send the device data 17 over the cellular telephone network 11. In other embodiments, the device data 17 may be transmitted via the LMR network 13.

The server 16 is configured to cause a given mobile wireless communications device 15a-15n to switch from the cellular telephone network 11 to the LMR network 13 based upon the device data 17, thereby reducing costs to the administrator. In particular, the server 16 is configured to transmit a message to the given mobile wireless communications device 15a-15n instructing a transition to the LMR network 13. Helpfully, this transition to the LMR network 13 is accomplished automatically and without user intervention.

Additionally, the server 16 is configured to cause the given mobile wireless communications device 15a-15n to switch from the cellular telephone network 11 to the LMR network 13 further based upon the estimated future geolocation. More specifically, if the given mobile wireless communications device 15a-15n is traveling into a coverage area of the LMR network 13, the server 16 is configured to instruct the given mobile wireless communications device to switch to the LMR network. (See FIG. 2).

The server 16 is configured to switch from the cellular telephone network 11 to the LMR network 13 further based upon one or more of the QoS rules. For instance, the QoS rules may include a minimum received signal strength for the LMR network 13 to compel a transition to the LMR network.

Moreover, the server 16 is configured to select a given LMR site 14a-14n from the plurality of LMR sites and communicate the given LMR site to the given mobile wireless communications device 15a-15n. The server 16 is configured to select the given LMR site 14a-14n based upon the plurality of QoS rules. When instructing the transition to the LMR network 13, the message from the server 16 also includes the selected given LMR site 14a-14n, and an associated LMR control channel frequency for connection thereto.

In some embodiments, once the server 16 has determined a transition to the LMR network 13 is to be made, the server 16 is configured to preregister the given mobile wireless communications device 15a-15n with the given LMR site 14a-14n. As will be appreciated, the preregistration will enable a seamless transition to the LMR network 13.

In short, based upon one or more of the device data 17, the estimated future geolocation, and the coverage map for the LMR network 13, the server 16 is configured to build a database on the current RF conditions for each of the plurality of mobile wireless communications devices 15a-15n. In some embodiments, the server 16 is configured to additionally use a coverage analysis software tool, such as the LMR RF coverage analysis tool/database, as available from the Harris Corporation of Melbourne, Fla. In particular, the LMR RF coverage analysis tool/database can analyze a system's coverage based on its architecture. For multi-broadcast systems, the coverage from all contributing individual sites can be considered. For simulcast systems, the coverage based on received signal levels and delay spread interference can be considered.

Another aspect is directed to a method of operating a communication system 10 comprising a cellular telephone network 11, a LMR network 13, and a plurality of mobile wireless communications devices 15a-15n. Each mobile wireless communications device 15a-15n is switchable from the cellular telephone network 11 to the LMR network 13, and generates device data 17. The method includes operating a server 16 to cause a given mobile wireless communications device 15a-15n to switch from the cellular telephone network 11 to the LMR network 13 based upon the device data 17.

Figure 2:
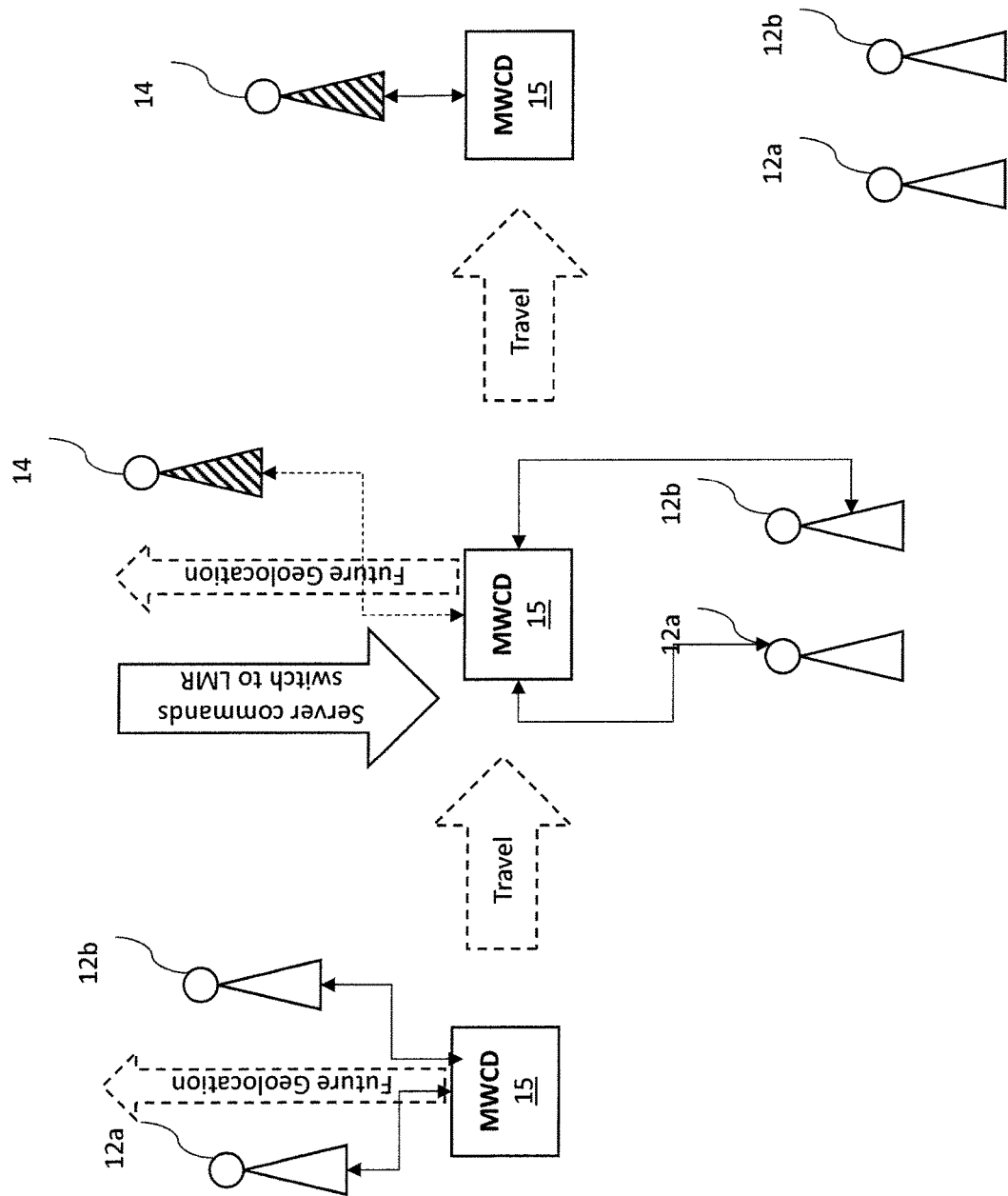
FIG. 2 is a diagram of a mobile wireless communications device transitioning from the cellular telephone network to the LMR network in an example embodiment of the communication system of FIG. 1.

Referring now to FIG. 2, in an exemplary use scenario, the operation of the communication system 10 is described. As the given mobile wireless communications device 15 travels in a geographic coverage area, the operational state of the given mobile wireless communications device 15 changes from left to right. Beginning on the left, the given mobile wireless communications device 15 is located out of coverage for the LMR network 13, but within coverage of the cellular sites 12a-12b of the cellular telephone network 11. Because of this, the given mobile wireless communications device 15 is connected to the cellular telephone network 11. As the given mobile wireless communications device 15 travels (middle portion), the device enters the coverage of the LMR network 13, and a selected LMR site 14. At this point, the server 16 is configured to cause the given mobile wireless communications device 15 to switch to the LMR network 13. On the right, the given mobile wireless communications device 15 has now traveled fully within coverage of the LMR network 13, disconnected from the cellular telephone network 11 (which has overlapping coverage), and has connected to the selected LMR site 14.

Figure 3:
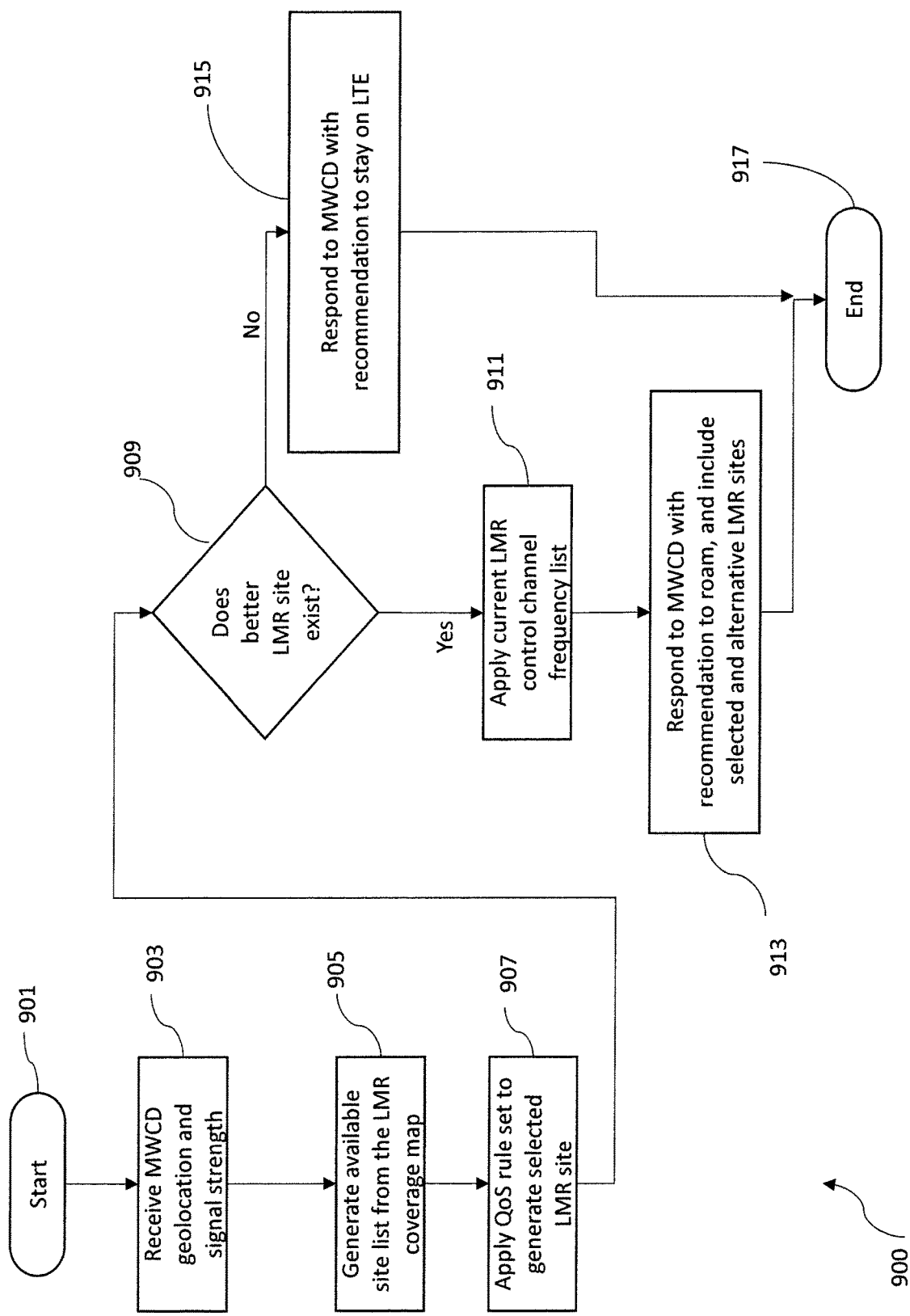
FIG. 3 is a flowchart illustrating a method for operating an example embodiment of the communication system of FIG. 1.

Referring now to FIGS. 1 and 3, an exemplary embodiment for the method for operation of the communication system 10 is now described using a flowchart 900. (Block 901). In particular, the flowchart 900 illustrates an LMR selection algorithm implemented by the server 16. At Block 903, the server 16 is configured to receive the geolocation and received signal strength of the given mobile wireless communications device 15a-15n. In essence, the server 16 is generating an RF snapshot of the given mobile wireless communications device 15a-15n with respect to the LMR network 13 and the cellular telephone network 11.

At Block 905, the server 16 is configured to generate an available LMR site list from the LMR coverage map stored therein. Here, the server 16 is configured to use the geolocation of the given mobile wireless communications device 15a-15n to determine a subset of LMR sites 14a-14n within range. At Block 907, the server 16 is configured to apply the plurality of QoS rules to the given mobile wireless communications device 15a-15n to determine the selected LMR site 14a-14n.

At Block 909, the server 16 is configured to determine whether the switch to the LMR network 13 should occur. If no, the server 16 is configured to instruct the given mobile wireless communications device 15a-15n to remain on the cellular telephone network 11. (Block 915). If yes, the server 16 is configured to apply a current LMR control channel frequency list to the given mobile wireless communications device 15a-15n at Block 911, and instruct the given mobile wireless communications device to connect to the LMR network 13 by sending the selected LMR site 14a-14n and an alternative LMR site. (Blocks 913, 917).

Advantageously, the communication system 10 may provide an approach to issues with LMR selection in LMR communications devices with integrated cellular transceivers. Each mobile wireless communications device 15a-15n may quickly transition from the cellular telephone network 11 to the LMR network 13 with no user intervention. The LMR/cellular converged devices provide respective cellular signal strength and position information on a configurable interval or during mission critical PTT call operation to the server 16 loaded with the customer specific LMR coverage maps. The server 16 analyzes the device data 17, and based on pre-defined QoS thresholds, the server 16 uses the LMR selection algorithm to provide the device with the control channel frequency information for the best available LMR site 14a-14n and its adjacent sites. Each mobile wireless communications device 15a-15n stores this information and automatically transition to the LMR network 13. The device position and LMR information is provided via Internet Protocol (IP) packets that can be transferred while voice operation is occurring over cellular so that the device does not experience service interruption until roaming is required.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. A communication system comprising:
a cellular telephone network;
a land mobile radio (LMR) network;
a plurality of mobile wireless communications devices, each switchable from said cellular telephone network to said LMR network, and each generating device data; and
a server configured to
cause a given mobile wireless communications device to periodically report the device data to said server, the device data comprising a geolocation of the given mobile wireless communications device,
generate a list of available LMR sites based upon the device data,
generate an estimated future geolocation for the given mobile wireless communications device, select a given LMR site from the list of available LMR sites and communicate the given LMR site to the given mobile wireless communications device, and cause the given mobile wireless communications device to switch from said cellular telephone network to the given LMR site of said LMR network based upon the device data and the estimated future geolocation.

2. The communication system of claim 1 wherein the device data comprises a received signal strength of the given mobile wireless communications device associated with said cellular telephone network.

3. The communication system of claim 1 wherein said server is configured to switch from said cellular telephone network to said LMR network further based upon at least one quality of service (QoS) rule.

4. The communication system of claim 1 wherein said LMR network comprises a plurality of LMR sites including the list of available LMR sites.

5. The communication system of claim 1 wherein said server is configured to select the given LMR site based upon at least one quality of service (QoS) rule.

6. The communication system of claim 1 wherein said server is configured to preregister the given mobile wireless communications device with the given LMR site.

7. The communication system of claim 1 wherein said cellular telephone network comprises an LTE cellular telephone network.

8. The communication system of claim 1 wherein said given mobile wireless communications device is configured to periodically report the device data to said server via said cellular telephone network.

9. A communication system comprising:
a plurality of mobile wireless communications devices, each switchable from a cellular telephone network to a land mobile radio (LMR) network, and each generating device data; and
a server configured to
cause a given mobile wireless communications device to periodically report the device data to said server, the device data comprising a geolocation of the given mobile wireless communications device,
generate a list of available LMR sites based upon the device data,
generate an estimated future geolocation for the given mobile wireless communications device,
select a given LMR site from the list of available LMR sites and communicate the given LMR site to the given mobile wireless communications device, and
cause the given mobile wireless communications device to switch from the cellular telephone network to the given LMR site of the LMR network based upon the device data and the estimated future geolocation.

10. The communication system of claim 9 wherein the device data comprises a received signal strength of the given mobile wireless communications device associated with the cellular telephone network.

11. The communication system of claim 9 wherein said server is configured to switch from the cellular telephone network to the LMR network further based upon at least one quality of service (QoS) rule.

12. The communication system of claim 9 wherein the LMR network comprises a plurality of LMR sites including the list of available LMR sites.

13. The communication system of claim 9 wherein said server is configured to select the given LMR site based upon at least one quality of service (QoS) rule.

14. The communication system of claim 9 wherein said server is configured to preregister the given mobile wireless communications device with the given LMR site.

15. The communication system of claim 9 wherein the given mobile wireless communications device is configured to periodically report the device data to said server via the cellular telephone network.

16. A method of operating a communication system comprising a cellular telephone network, a land mobile radio (LMR) network, and a plurality of mobile wireless communications devices, each switchable from the cellular telephone network to the LMR network, and each generating device data, the method comprising:
operating a server to
cause a given mobile wireless communications device to periodically report the device data to the server, the device data comprising a geolocation of the given mobile wireless communications device,
generate a list of available LMR sites based upon the device data,
generate an estimated future geolocation for the given mobile wireless communications device,
select a given LMR site from the list of available LMR sites and communicate the given LMR site to the given mobile wireless communications device, and
cause the given mobile wireless communications device to switch from the cellular telephone network to the given LMR site of the LMR network based upon the device data and the estimated future geolocation.

17. The method of claim 16 wherein the device data comprises a received signal strength of the given mobile wireless communications device associated with the cellular telephone network.

18. The method of claim 16 further comprising operating the server to switch from the cellular telephone network to the LMR network further based upon at least one quality of service (QoS) rule.

19. The method of claim 16 wherein the LMR network comprises a plurality of LMR sites including the list of available LMR sites.

20. The method of claim 16 further comprising operating the server to select the given LMR site based upon at least one quality of service (QoS) rule.

21. The method of claim 16 further comprising operating the server to preregister the given mobile wireless communications device with the given LMR site.

22. The method of claim 16 wherein the cellular telephone network comprises an LTE cellular telephone network.

23. The method of claim 16 wherein the given mobile wireless communications device is configured to periodically report the device data to the server via the cellular telephone network.

* * * * *